Figure 1:
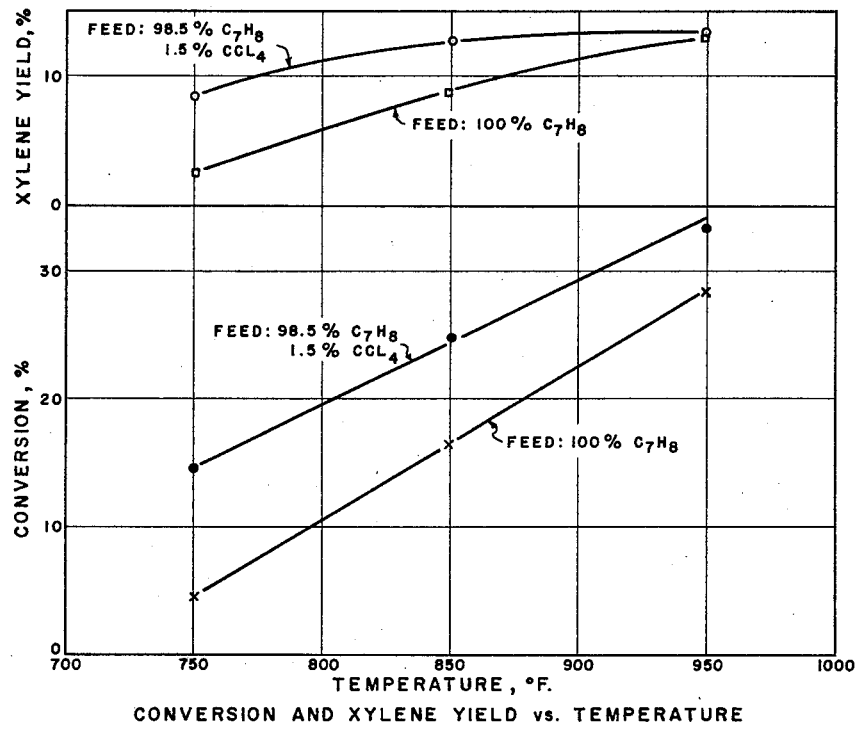

March 24, 1964  J. A. PLANCHARD, JR  3,126,422
VAPOR PHASE DISPROPORTIONATION OF AROMATICS
Filed March 16, 1961

CONVERSION AND XYLENE YIELD vs. TEMPERATURE

INVENTOR.
JEROME A. PLANCHARD,
BY
ATTORNEY.

3,126,422
VAPOR PHASE DISPROPORTIONATION OF AROMATICS
Jerome A. Planchard, Jr., Baytown, Tex., assignor, by mesne assignments, to Esso Research and Engineering Company, Elizabeth, N.J., a corporation of Delaware
Filed Mar. 16, 1961, Ser. No. 96,264
7 Claims. (Cl. 260—671)

The present invention is directed to a method for disproportionation of aromatic hydrocarbons. More specifically the invention is concerned with converting aromatic hydrocarbons to other aromatic hydrocarbons. In its more specific aspects, the invention is concerned with the production of aromatic hydrocarbons having a different number of carbon atoms than the aromatic feed stock from which the product is found.

The present invention may be briefly described as a method for disproportionation of aromatic hydrocarbons in which a single ring aromatic hydrocarbon is contacted with a silica-alumina catalyst in the presence of a small but sufficient amount of a halogen such as chlorine under temperature and pressure conditions and in the presence of free hydrogen for a length of time sufficient to form a disproportionated product. The disproportionated product is then recovered and may be separated into various component hydrocarbons.

The feed stock of the present invention is the single ring aromatic hydrocarbons boiling within the range from about 200° to about 600° F. The aromatic hydrocarbon feed may be a petroleum fraction containing aromatics or it may be a purified aromatic hydrocarbon. As examples of the aromatic hydrocarbons found in the feed stock of the present invention may be mentioned toluene, ortho-, meta- and para-xylenes, ethylbenzene, trimethylbenzene, tetramethylbenzene, ethylmethylbenzene and the like. Other aromatic hydrocarbons may be employed within the boiling range mentioned.

The catalyst employed in the practice of the present invention is a silica-alumina catalyst having a ratio of silica to alumina within the range from about 9:1 to about 1:1. A satisfactory silica-alumina catalyst contains from about 25% of alumina oxide and about 75% of silicon dioxide, both percentages being by weight.

The hydrogen employed in the practice of the present invention may be purified hydrogen or may be a free hydrogen containing gas. The amount of hydrogen employed should be sufficient to provide a ratio of hydrogen to feed aromatic hydrocarbon in the range from about 0.5:1 to about 5:1. An amount of hydrogen from about 600 cubic feet to about 6000 cubic feet per barrel of feed may be used.

The chlorine employed in the practice of the present invention may be provided from various compounds. For example, gaseous chlorine or hydrogen chloride may be used both in an anhydrous condition. Liquid carbon tetrachloride may also be used, such as those having 2 to 6 alkyl groups on the ring, said alkyl groups containing 1 to 6 carbon atoms. Other chlorine-providing compounds may be employed, such as, methyl chloride, methylene chloride, $CHCl_3$ and the corresponding fluoride and bromide compounds. Iodine may also be used as such or as compounds thereof. When carbon tetrachloride is employed, it may be injected with the feed. The amount of chlorine may be within the range from about 0.5 to about 5% by volume based on the feed hydrocarbon, preferably within the range from about 0.5 to about 2.5% by volume particularly when toluene is the feed. When chlorine or anhydrous hydrogen chloride is used, they also may be injected with the feed or, if desired, the silica-alumina catalyst may be treated with the anhydrous chlorine or hydrogen chloride prior to contacting same with the aromatic feed hydrocarbon.

Figure 2:
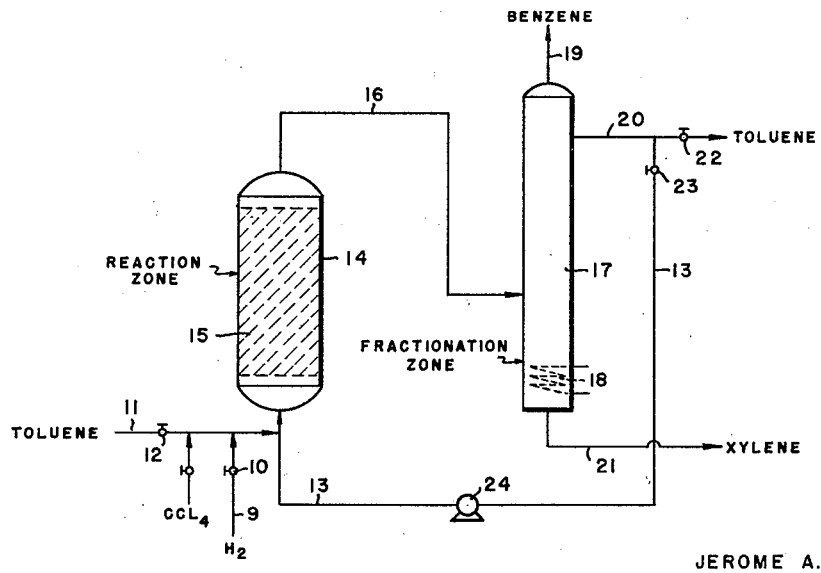

The present invention will be further described by reference to the drawing in which:

FIG. 1 is a plot of data showing the relationship between temperature and conversion and between xylenes yield and temperature; and FIG. 2 is a flow diagram of preferred mode of practicing the invention.

Referring now to the drawing and particularly to FIG. 2, numeral 11 designates a charge-line through which a feed hydrocarbon such as toluene may be introduced from a source not shown. Hydrogen is introduced by line 9 controlled by valve 10. Numeral 12 designates a valve which controls line 11 and the aromatic feed hydrocarbon is introduced into line 13 leading into a reaction zone 14 provided with a bed 15 of silica-alumina catalyst. The toluene introduced by lines 11 and 13 is in a heated condition sufficient to maintain a temperature within the range from about 650° to about 1000° F. in reaction zone 14 under a pressure in the range from about 200 p.s.i.g. to about 600 p.s.i.g. Conditions are adjusted in zone 14 such that the toluene contacts the catalyst for a period of time from about 5 to about 40 seconds. Under these conditions, a product is formed and in which the aromatic hydrocarbon feed is disproportionated. The product discharged from zone 14 by line 16 and introduced thereby into a fractionation zone 17 illustrated by a distillation tower which may be a plurality of distillation towers as may be desired. Zone 17 is provided with suitable internal vapor-liquid contacting means to allow separation among the products of the disproportionation reaction. Conditions of temperature and pressure are adjusted in zone 17 by a heating means illustrated by a steam coil 18. Under the distillation conditions prevailing in zone 17, an overhead fraction containing benzene is withdrawn by line 19 and a toluene side stream fraction is withdrawn by line 20, which is the unconverted material. Xylenes are discharged and recovered by line 21. The unconverted toluene may be discharged from the system by opening valve 22, but preferably the unconverted toluene is routed through line 13 by opening valve 23 therein. Pump 24 in line 13 allows the unconverted toluene to be reintroduced into reaction zone 14.

By virtue of an operation such as described in FIG. 2, benzene and xylene may be produced from toluene and the toluene recycled to extinction.

In order to illustrate the invention further, several runs have been carried out in which a silica-alumina catalyst was employed. In one series of runs, the feed stock had added to it, carbon tetrachloride, and in another series of runs, the feed stock did not contain carbon tetrachloride. The conditions for the several runs, and the results thereof, as well as the analysis of the products, are shown in the following table:

for a sufficient length of time to form a disproportionated product, said alkyl benzene being selected from the group consisting of toluene, ethylbenzene, and alkyl ben-

TABLE I
*Vapor Phase Toluene Disproportionation*

| Run | 1 | 2 | 3 | 4 | 5 | 6 |
| --- | --- | --- | --- | --- | --- | --- |
| Catalyst | $Al_2O_3$—$SiO_2$ (25-75% by Wt.) | | | | | |
| Feed, Percent by Vol | (98.5% toluene $C_7$; 1.5% $CCl_4$) | | | (100% toluene) | | |
| Run Conditions: | | | | | | |
| Temperature, °F | 750 | 851 | 943 | 751 | 848 | 947 |
| Press. (p.s.i.g.) | 400 | 400 | 400 | 400 | 400 | 400 |
| Flow rate, volumes/hour | 258 | 237 | 218 | 257 | 257 | 217 |
| $H_2$/oil | 1.1 | 0.96 | 1.1 | 1.07 | 1.07 | 0.94 |
| Time of contact, seconds | 26 | 27 | 26 | 27 | 25 | 28 |
| Liquid Composition, Wt. Percent: | | | | | | |
| Benzene | 6.17 | 12.00 | 19.66 | 1.83 | 7.48 | 15.25 |
| Xylene | 8.55 | 12.83 | 13.64 | 2.55 | 8.98 | 13.12 |
| Toluene | 85.28 | 75.17 | 66.70 | 95.62 | 83.54 | 71.63 |
| Total | 100.00 | 100.00 | 100.00 | 100.00 | 100.00 | 100.00 |
| Conversion, Wt. Percent | 14.7 | 24.8 | 33.3 | 4.4 | 16.5 | 28.3 |

The data in Table I are plotted in FIG. 1.

Referring to FIG. 1 and Table I, it may be seen that under identical conditions the feed stock containing the carbon tetrachloride provided three times the conversion of toluene at 750° F. while the xylene yield was 8.5% compared to 2.6% where the feed was free of chlorine. A great advantage of the present invention is that the same xylene yield may be obtained from toluene at approximately a 100° F. lower reaction temperature. For example, at 950° F. in the chlorine-free feed, a xylene yield of 13.1% was obtained, while in the chlorine-containing feed at 850° F., the yield was 12.8%. It may also be noted that at 850° F. in the chlorine-containing feed, the conversion was approximately 3% less than in the chlorine-free feed at 950° F. indicating a higher selectivity to disproportionation, which may be obtained at the lower temperature without sacrificing xylene yield. The lower temperatures therefore decrease the percentage of gas and coke for a given yield. If high yields of benzene are desired, a 4½% increase in benzene yield may be obtained by operating under identical conditions, say for example, 950° F.

It may be seen from the following data that the present invention is quite advantageous and useful in that the presence of chlorine in the reaction zone provides for increases in yields at the same temperature or the same yield at substantially lower temperatures. The present invention is therefore advantageous and useful in that aromatic hydrocarbons may be produced at substantial savings in operating costs and investment.

The nature and objects of the present invention having been completely described and illustrated, what I wish to claim as new and useful and secure by Letters Patent is:

1. A method which comprises introducing into a disproportionation zone an aromatic hydrocarbon consisting essentially of a single alkyl benzene to contact a silica-alumina catalyst in the presence of a halogen selected from the group consisting of chlorine and chlorine-providing compounds at a temperature within the range from about 650° F. to about 1000° F. under a pressure within the range from about 200 to about 600 pounds per square inch and in the presence of a sufficient amount of free hydrogen to provide a ratio of hydrogen to feed within the range from about 0.5:1 to about 5:1 for a sufficient length of time to form a disproportionated product, said alkyl benzene being selected from the group consisting of toluene, ethylbenzene, and alkyl benzenes having 2 to 6 alkyl groups on the ring, said alkyl groups containing from 1 to 6 carbon atoms, and recovering said product.

2. A method in accordance with claim 1 wherein said halogen is present in an amount within the range from about 0.5 to about 5.0% by volume.

3. A method in accordance with claim 2 wherein said time is within the range from about 5 to about 40 seconds to form said disproportionated product.

4. A method in accordance with claim 3 wherein said alkyl benzene is toluene.

5. A method in accordance with claim 3 wherein said alkyl benzene is xylene.

6. A method which comprises introducing into a disproportionation zone an aromatic hydrocarbon consisting essentially of toluene containing from about 0.5 to about 2.5% by volume of carbon tetrachloride to contact a silica-alumina catalyst at a temperature within the range from about 650° F. to about 1000° F. under a pressure within the range from about 200 to about 600 pounds per square inch in the presence of a sufficient amount of free hydrogen to provide a ratio of hydrogen to toluene within the range from about 0.5:1 to about 5:1 for a length of time within the range from about 10 to about 60 seconds to form a disproportionated product, and recovering benzene and xylene from said product.

7. A method which comprises introducing into a disproportionation zone an aromatic hydrocarbon consisting essentially of a single alkyl benzene selected from the group consisting of toluene, ethylbenzene, and alkyl benzenes having 2 to 6 alkyl groups on the ring, said alkyl groups containing 1 to 6 carbon atoms to contact a silica-alumina catalyst in the presence of a halogen selected from the group consisting of chlorine and chlorine-providing compounds at a temperature and under a pressure and in the presence of free hydrogen for a length of time sufficient to form a disproportionated product, and recovering said product.

References Cited in the file of this patent
UNITED STATES PATENTS

| 2,349,834 | Schmerling et al. | May 30, 1944 |
| 2,385,524 | Mattox | Sept. 25, 1945 |
| 2,739,991 | Hervert | Mar. 27, 1956 |
| 2,834,821 | Bergsteinsson | May 13, 1958 |